United States Patent [19]
Compoly et al.

[11] 3,846,693
[45] Nov. 5, 1974

[54] SELECTIVELY SWITCHED, MALFUNCTION-RESPONSIVE THREE PHASE AND PARALLEL LOGIC BOX FOR PLURAL STATIC INVERTERS

[75] Inventors: Albert William Compoly, Belmar; Alfred Charles Temple, Manasquan, both of N.J.

[73] Assignee: Avionic Instruments Inc., Rahway, N.J.

[22] Filed: Oct. 16, 1973

[21] Appl. No.: 406,912

[52] U.S. Cl..................... 321/12, 307/58, 321/27 R, 331/49
[51] Int. Cl. ............................................ H02m 1/18
[58] Field of Search ............... 321/3, 5, 8 R, 11, 12, 321/27 MS, 27 R; 331/45, 49; 307/58, 82

[56] References Cited
UNITED STATES PATENTS

| | | | |
|---|---|---|---|
| 2,824,274 | 2/1958 | Holt | 321/27 R |
| 3,046,412 | 7/1962 | Seike | 307/82 |
| 3,050,674 | 8/1962 | Moore | 321/27 R |
| 3,144,599 | 8/1964 | Brahm | 321/5 |
| 3,177,420 | 4/1965 | Barber et al. | 321/5 |
| 3,281,641 | 10/1966 | Hodgson | 321/8 R |
| 3,621,365 | 11/1971 | Beck et al. | 321/27 R |
| 3,691,449 | 9/1972 | Feltman | 321/27 MS |

Primary Examiner—William H. Beha, Jr.
Attorney, Agent, or Firm—Ostrolenk, Faber, Gerb & Soffen

[57] ABSTRACT

Circuitry for operating static inverters which individually are capable of developing a regulated a.c. output at a controlled frequency rate from a d.c. input. The circuitry derives its d.c. input from one or more of the static inverters for developing synchronizing signals to operate the static inverters so as to enable them to develop three phase a.c. and enables the inverters to be connected in either wye or delta fashion. By means of a single phase/three phase switch a second mode of operation can be obtained for operating the static inverters in a single phase parallel manner. The logic box operation is controlled by a master oscillator which is continuously monitored to ascertain its operation. During normal operation of the master oscillator, the local oscillators of the static inverters connected to the logic box are disabled. In the event of a failure in the master oscillator the local oscillators of the static inverters are automatically enabled to permit continuous operation of the static inverters. The logic box, when combined with three static inverters provides means for driving three phase equipment through the use of single phase power sources (i.e., static inverters) or alternatively, provides an increase in the power capability of the static inverter equipment when operated in single phase parallel fashion.

8 Claims, 5 Drawing Figures

FIG. 5.
0  30  60  90  120 150 180 210 240 270 300 330  0  30  60  90  120 150 180 210 240 270 300 330  0    400 HZ
                                                                                                      ELEC.
                                                                                                      DEGREES

3,846,693

SELECTIVELY SWITCHED, MALFUNCTION-RESPONSIVE THREE PHASE AND PARALLEL LOGIC BOX FOR PLURAL STATIC INVERTERS

The present invention relates to static inverters and more particularly to a novel multiphase generating circuit for controlling a plurality of static inverters otherwise individually capable of providing a single phase a.c. output to thereby enable static inverters when combined with the multiphase logic box to be utilized for powering three phase equipment. Single phase/multiphase switch means are also provided for selectively operating the equipment in either a three phase or parallel single phase operating mode.

BACKGROUND OF THE INVENTION

Static inverters are presently employed in a wide variety of applications and are normally employed for their capability of inverting a d.c. input into a regulated a.c. output operating at a controlled frequency. Static inverters, i.e., inverters comprised of solid state devices, are quite frequently utilized to generate a regulated a.c. output having a frequency of 400 Hz, which frequency is especially adapted for use in powering aircraft instrumentation.

Conventional static inverters are typically capable of providing single phase a.c. power. In instances where it is desired to provide a power source fo three phase equipment it has become necessary to design a special three phase power source which has not heretofore been capable of utilizing individual single phase static inverter circuits.

A BRIEF DESCRIPTION OF THE INVENTION

The present invention is characterized by providing logical circuitry which may be used in combination with conventional static inverters to provide three phase power where a three phase source of power is not available. Through the use of the logical circuitry of the present invention it is now for the first time been possible to provide the small aircraft operator with control logic combined with conventional static inverters to power three phase equipment with single phase power sources. Alternatively, the circuitry of the present invention is further characterized by providing three phase/single phase switch means for selectively providing either three phase power or single phase power of increased power capability.

The logical circuitry of the present invention comprises master oscillator means which derives its d.c. input from any one of the static inverters connected thereto to generate a master clock signal. Means are provided for constantly monitoring the output of the master oscillator to disable the local oscillators of each of the static inverters and conversely for re-enabling the local oscillators of each of the static inverters in the case where the master oscillator is rendered inoperative for any reason.

The output of the master oscillator is converted into synchronizing signals which occur at exact 120° phase angle intervals, which signals are utilized to control each of the individual static inverters coupled to the logical circuitry to provide a.c. output signals which are 120° out of phase with one another enabling the static inverter outputs to be connected for three phase operation in either delta or wye fashion.

Switch means are provided for selectively operating the static inverters controlled by the logical circuitry to operate in either a three phase or parallel single phase mode of increased power output as compared with the power output of any single static inverter.

Further circuitry is provided for assuring the fact that the operating state of each static inverter at the beginning of each cycle will be the same as the operating state of every other static inverter to assure that all static inverters are operating in the same state at the same time in addition to being operated in synchronism during the parallel single phase mode or being operated in the three phase mode.

A BRIEF DESCRIPTION OF THE FIGURES AND OBJECTS OF THE INVENTION

It is therefore one object of the present invention to provide a novel logical circuitry for controlling a plurality of individual static inverters to power three phase equipment.

Another object of the present invention is to provide a novel logical circuitry for use in controlling a plurality of static inverters to selectively enable their operation in either a multiphase or parallel single phase mode.

Another object of the present invention is to provide a novel logical circuitry for operating a plurality of individual static inverters to power multiphase equipment wherein means are provided for assuring that each inverter is in the proper state at all times during its operation.

Still another object of the present invention is to provide a novel logical circuitry for use in controlling a plurality of static inverters to alternatively provide either a three phase or parallel single phase a.c. output in which means are utilized to permit continued operation of the individual static inverters in the event of any failure in the master oscillator of the control logic to thereby yield a safety feature wherein the individual static inverters remain operational and in fact continue operation without interruption regardless of the operating condition of the master oscillator.

The above as well as other objects of the invention will become apparent when reading the accompanying description and drawings in which:

FIG. 5 shows a plurality of waveforms useful in explaining the operation of the present invention.

DETAILED DESCRIPTION OF THE FIGURES

Figure 1:
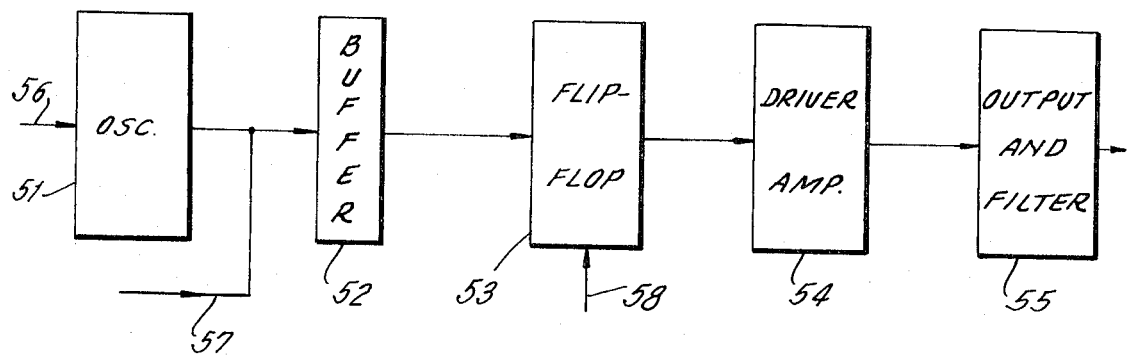
FIG. 1 is a block diagram of a static inverter of the type which may be controlled by the novel logical circuitry of the present invention and which is presented herein for facilitating an understanding of the presnt invention.

FIG. 1 shows a simplified block diagram of the basic components of a static inverter 50 which may be used with the novel logical control circuitry of the present invention and which is comprised of an oscillator 51 which typically develops an output signal of 800 Hz. A more detailed description of a static inverter which may be utilized with the control circuitry of the present invention is set forth in U.S. Pat. No. 3,691,449 issued Sept. 12, 1972 and incorporated herein by reference thereto.

The output oscillator 51 is coupled to a bufferamplifier circuit 52 which functions to amplify and couple the local oscillator output signal to a bistable flip-flop circuit 53 which functions as a frequency divider circuit to reduce the output frequency of oscillator 51 to 400 Hz. The frequency divided output of flip-flop 53 is coupled to a driver amplifier circuit 54 which serves to amplify the 58c output of flip-flop 53 and couple the output to filter circuit 55 which includes filter means for developing a regulated a.c. signal having a precise output frequency of 400 Hz and which is especially adapted for use in powering aircraft instrumentation and the like.

Figure 2:
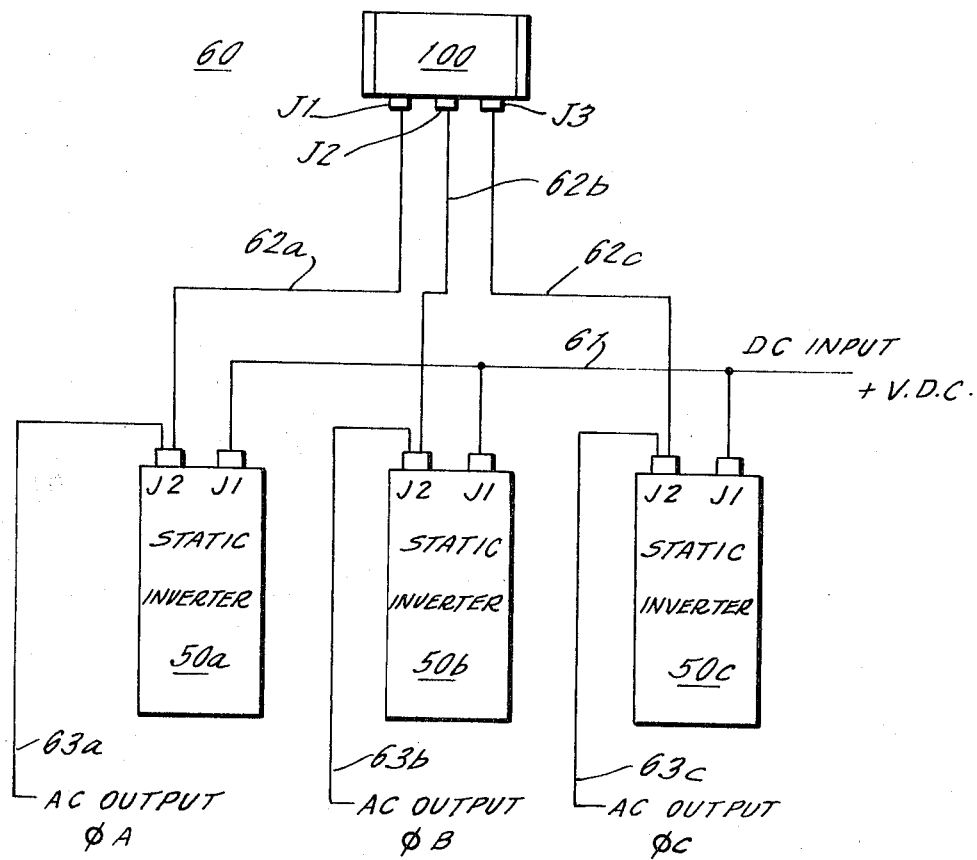
FIG. 2 shows a simplified system wiring diagram of the logical control circuitry and the manner in which a plurality of static inverters may be connected thereto in a typical three phase installation.
Figure 3:
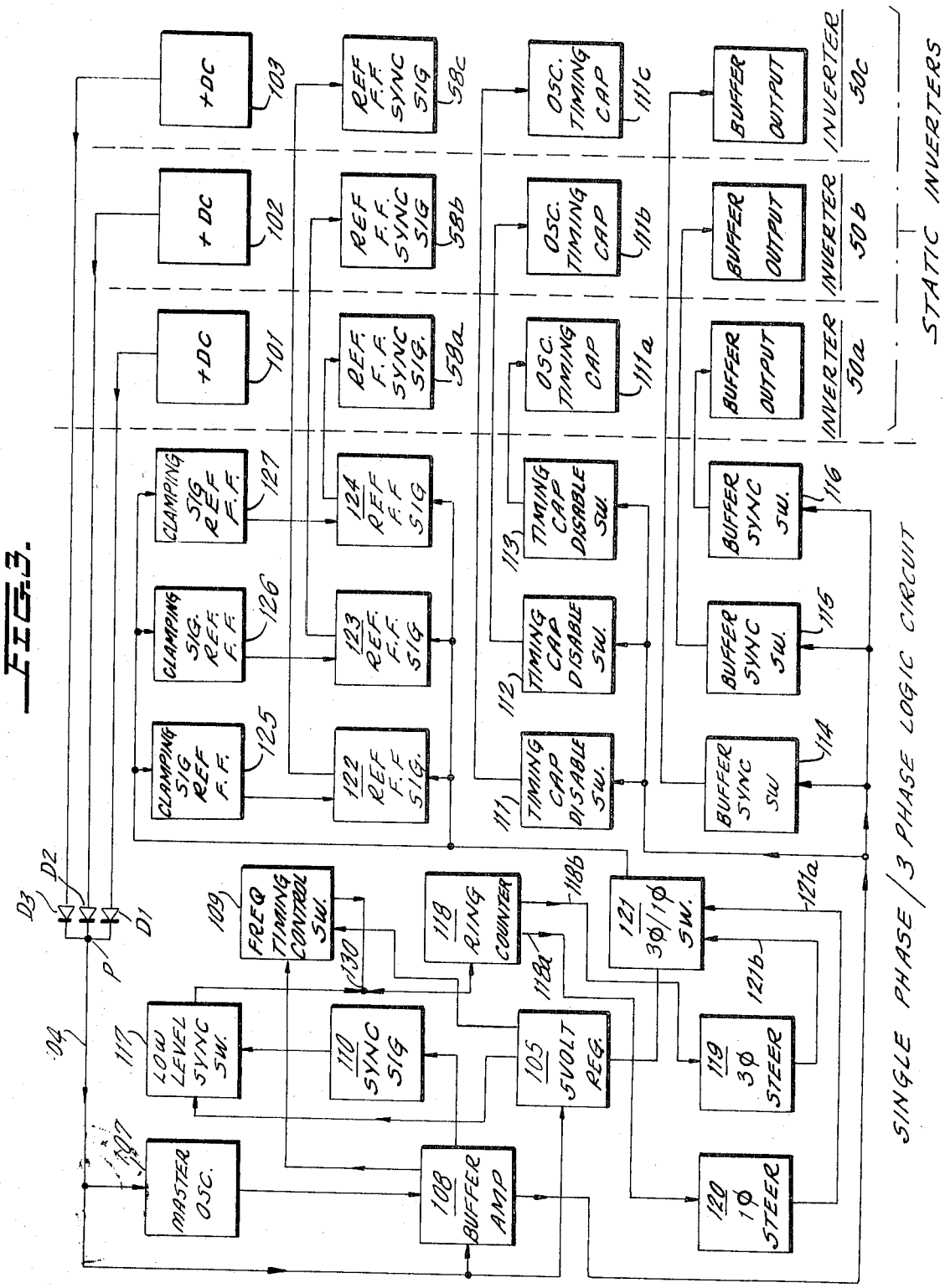
FIG. 3 is a block diagram showing the novel logical control circuitry of FIG. 2 in greater detail.
Figure 4:
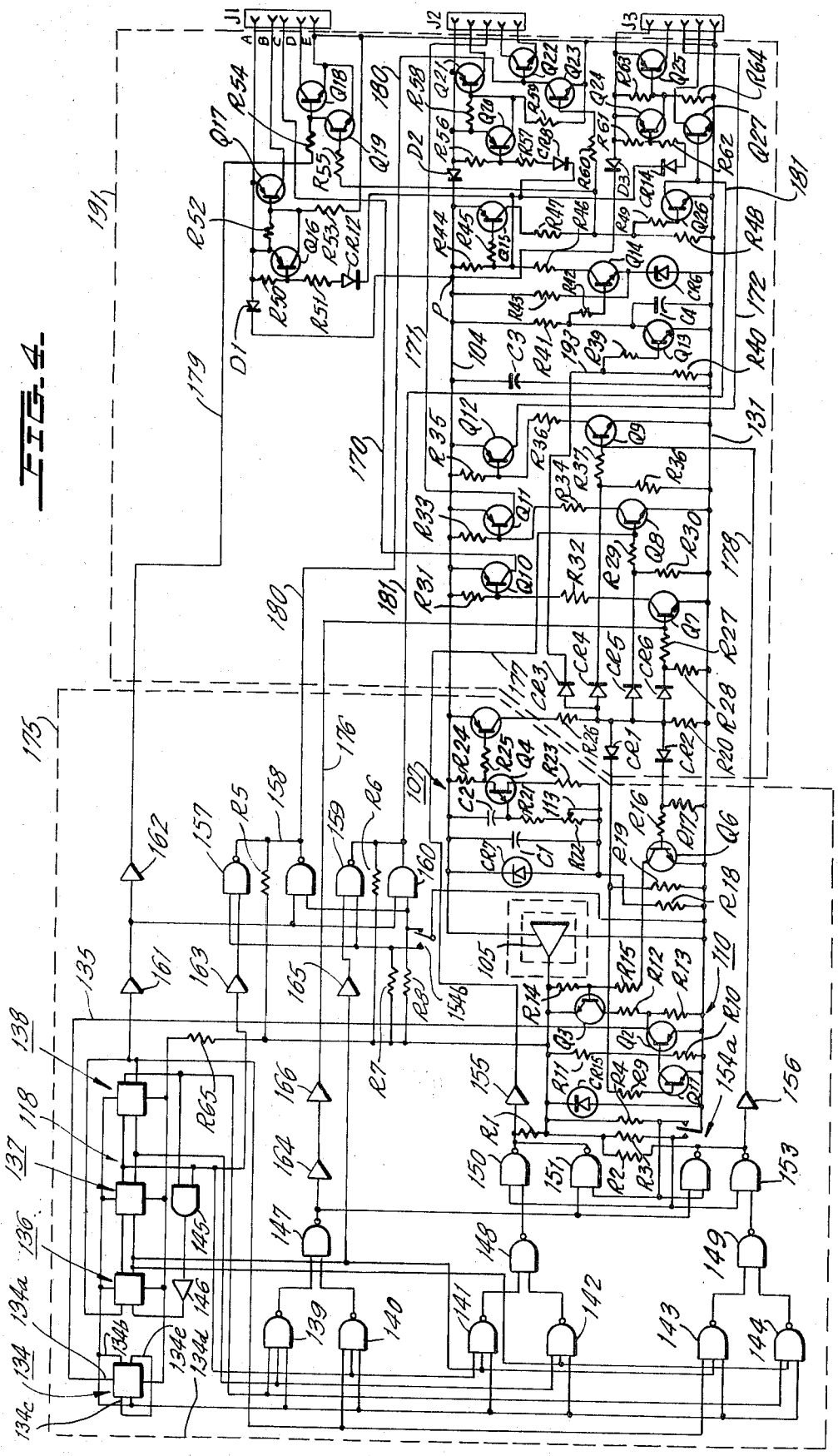
FIG. 4 shows a detailed schematic diagram of the novel logical control circuitry of FIGS. 2 and 3.

As will be better understood from a consideration of the detailed description of the novel logical control circuitry of FIGS. 2–4, the local oscillator 51 of each static inverter 50 is further provided with an input 56 which is adapted to receive a disabling signal coupled to the timing capacitor (not shown for purposes of simplicity) of local oscillator 51 to enable local oscillator 51 to be disabled when the static inverter 50 operates under control of the disabling signal developed by the novel control logic circuitry. The buffer circuit 52 of static inverter 50 is further provided with an input 57 for receiving a synchronizing signal from the logical control circuitry. Flip-flop 53 of the static inverter is provided with a reference synchronizing signal from the logical control circuitry to insure the fact that the state of the flip-flop is proper and is not inverted, which operation will be more fully described hereinbelow.

Thus, as can be seen from a considration of the static inverter 50 shown in FIG. 1, the static inverter is capable of converting a d.c. input level into a highly regulated a.c. output operating at a precise frequency rate.

FIG. 2 shows a system wiring diagram 60 in which a three phase logical control circuit 100 is electrically connected to three static inverters 50a–50c which may be of the type shown in FIG. 1. The static inverters 50a–50c are powered from a single d.c. source VDC connected in common to the three inverters through bus 61. Three cables 62a–62c connect the logical control circuitry 100 to each inverter in the manner shown. The d.c. input utilized to power static inverters 50a–50c is also coupled to the logical control circuitry 100 through the cables 62a–62c which are coupled to the logical control circuitry through connectors J1, J2 and J3, respectively.

The logical control circuitry, as will be more fully described, serves to generate synchronizing signals which are 120° out of phase with one another to control the static inverters so as to provide three phase power at th outputs 63a–63c of the static inverters. The output connections of the individual static inverters 50a–50c are not affected by the control logic circuitry 100 and they may be connected in either wye or delta fashion.

The alternative operating mode of the logical control circuitry, as will also further be fully described hereinbelow, and which is selected by means of a double pole switch, permits the equipment to be operated in a parallel signal phase manner to increase the power capability of 400 Hz equipment. In the single phase mode, the outputs 63a–63c may be connected in common, if desired.

FIG. 3 shows a more detailed block diagram of the novel logical control circuitry 100 and the simplicity of use with three static inverters of the type shown in FIG. 1.

The d.c. power for operating the logical control circuitry 100 is derived from each of the three static inverters connected thereto with boxes 101, 102 and 103 representing the d.c. power taken from the static inverters. The inputs 101, 102 and 103 are each coupled to associated diodes D1, D2 and D3 whose cathodes are connected in common to bus 104 which simultaneously provides d.c. power for master oscillator 107, buffer-amplifier 108 and five volt regulator circuit 118. Diodes D1–D3 serve to isolate the static inverters and the logic control circuit.

Master oscillator 107, which derives its d.c. power from the static inverters in the manner set forth hereinabove, produces a train of signals at a precise frequency. For applications in which 400 Hz inverters are employed, master oscillator 107 operates at 4,800 Hz. However, it should be noted that the circuitry of the present invention is not limited to any one frequency and may be set for a wide range of frequencies, dependent only upon the needs of the particular application.

Buffer-amplifier 108 boosts the signal power of master oscillator 107 and applies its output to a frequency timing control switch 109, a synchronization switch 110 and three timing capacitor control switches 111–113, and three buffer synchronization switches 114–116.

The sync switch 110 drives a low level sync switch 117.

In the prefrred embodiment of the present invention, the logical control circuit is preferably an integrated circuit design. For this reason, a 5 volt regulator 105 is utilized to supply power for all of the integrated circuit components.

The frequency timing control switch 109 and low level sync switch 117 have their output signals mixed at 130 to drive a ring counter 118 that develops three sets of square waves which are 120 electrical degrees apart. The ring counter output 118a goes to the input of a single phase steering circuit 120 while the three phase output 118b of ring counter 118 goes to the input of a three phase steering circuit 119. The outputs of circuits 119 and 120 are coupled to inputs 121a and 121b of a three phase/single phase switch 121 which is designed to provide for selective operation in either a three phase or a single phase operating mode.

The output of switch 121 is coupled to reference flip-flop logic circuits 122–124 which respectively generate output signals that control the reference flip-flops in the static inverters.

When the system is in the three phase output mode, the parallel steering circuitry 120 is disabled and when the system is in the parallel operating mode, the three phase steering circuitry is disabled. The mode of operation is set manually by a double pole, double throw switch incorporated in switch means 121.

FIG. 4 is a detailed schematic showing the logical control circuitry of FIGS. 2 and 3 in which power for operating the logical control circuitry is derived from pin A of each of the connectors J1, J2 and J3 which couple the cables of each static inverter to the logical control circuitry. The critical circuit elements of the logical control circuitry are diode isolated by diodes D1, D2 and D3 from the raw DC voltage of the static inverters. As can also be seen in FIG. 3, the cathodes of these diodes are connected in common at point P to bus 104. Capacitor C3 is coupled between bus 104 and ground reference bus 131 which can be seen to be connected in common to the E terminal of each of the connectors J1, J2 and J3. Capacitor C3 serves as a filter for smoothing the diode bus voltage.

Power for the integrated circuits is obtained by the 5 volt regulator 105 which in itself is an integrated circuit regulator. The master oscillator 107 is comprised of capacitor C2, resistors R21, R23, R24 and adjustable resistor R22 having slider arm 133, as well as complementary unijunction transistor Q4. Oscillator 107 generates a pulse frequency of 4,800 Hz. Adjustment of slider arm 133 permits the oscillator to be adjusted to obtain the desired output frequency. The output of the oscillator is taken from one electrode of Q4 and is coupled to the input of bufferamplifier 108 through resistor R25. Buffer-amplifier 108 is comprised of transistor Q5 whose emitter is coupled to bus 104 and whose collector is coupled to ground reference bus 131 through resistors R26 and R20. The collector of Q5 drives the sync signal circuit 110 consisting of resistors R9, R10, R11, R12, R13, R14, R15, R16, R17, R18 and R19, transistors Q1, Q2, Q3, and Q6 and diodes CR1 and CR2.

The primary clock signal for bistable flip-flop 134 is taken from the collector of Q2 which is coupled through conductor 135 to input 134a of bistable flip-flop 134. 134 is a J-K type flip-flop capable of generating square waves at its two outputs 134b and 134c which are 2,400 Hz each. Output 134b is utilized as a secondary clock for flip-flops 136, 137 and 138 which are interconnected to form ring counter 118 and which is also used as logic timing for the inputs of NAND gates 139–144 each of which are designed to generate a low output when all of its inputs are high and conversely to develop a high output when at least one of its inputs are low. Output 134b is further connected to terminal 134d to satisfy requirements for toggling, as is also the case with output 134c which is coupled to terminal 134e of flip-flop 134.

Ring counter 118 is further comprised of NAND gate 145 and inverter 146 which are utilized to prevent any anomalies from occuring in circuit operations such as, for example, starting out of sequence. Gates 145 and 146 provide a self-correcting feature in that they prevent flip-flop 136 from toggling until both flip-flops 137 and 138 are in the correct phase sequence. The outputs of flip-flops 136, 137 and 138 are square waves each operating at a frequency of 400 Hz and separated by 120 electrical degrees. The phase sequence is 136C, 137B and 138A and corresponds to connectors J1 as phase A, J2 as phase B and J3 as phase c. The outputs of ring counter 118 are utilized to derive buffer-amplifier sync signals for each of the three inverters. The sync signal trains must be at 800 Hz each and separated by 60 electrical degrees and also in step with the oscillator as Q5 is the reference buffer signal generator. The logic circuitry mix the signals from several sources to build an "enable" signal at a specific time slot to each of the buffer amplifiers to provide a correct clock signal for each of the static inverters.

FIG. 5 shows a plurality of wave forms useful in describing the operation of the logic control circuitry. Wave form 401 represents an input train of waves generated by flip-flop 134 at a frequency of 2,400 Hz and each time period is equivalent to 30 electrical degrees of a 400 Hz wave form. Wave form 402 represents the output signal derived from bistable flip-flop 137 and has a frequency of 400 Hz. Waveform 403 represents the output of bistable flip-flop 138 which also operates at 400 Hz, but can be seen to be 120 electrical degrees out of phase relative to waveform 402. The signals represented by waveforms 401, 402 and 403 are applied to respective inputs of a three input NAND gate 139 yielding an output signal whose waveform is shown at 404. It can be seen that during the time between 120 and 150 electrical degrees waveforms 401, 402 and 403 are all simultaneously high causing the NAND gate to yield a low output as represented by waveform 404. This condition does not occur again until 120–150 electrical degrees of the second cycle occurs, as again can be seen from waveform 404.

A second set of waveforms 401, 405 and 406 are mixed in NAND gate 140 and yield a resultant output signal which is shown by waveform 407 which yields a low output between 300 and 330 electrical degrees when all three waveforms 401, 405 and 406 are simultaneously high.

When the signals represented by waveforms 405 and 404 are mixed in input NAND gate 147, the resulting signal is represented by waveform 408. This waveform shows that there are 30 electrical degrees conduction periods occurring every 180 electrical degrees. Similarly, waveforms 409 and 410 represent the outputs developed by inputs signals applied to NAND gates 141, 142, 148 and 143, 144 and 149, respectively. It can be seen that the waveforms 408, 409 and 410 are alike except that they are each displaced from one another by 120 electrical degrees. Two of these waveforms, for example, waveforms 409 and 410, are applied to the three phase parallel switch arrangement consisting of NAND gates 150, 151, 152 and 153 and resistors R1, R2, R3 and R4 and one-half of the double pole, double throw switch 154a which forms part of the three phase/single phase switch means 121 shown in FIG. 3.

When switch portion 154a is in a first position, both signals are allowed to pass through inverters 155 and 156 unimpeded resulting in three phase operation. If switch 154a is in the opposite position, the two wave trains will be blocked and waveform 408 will be substituted in their place to provide single phase operation with all static inverters in phase synchronism.

The other half 154b of the double pole, double throw switch performs a similar function with the output signals at the ring counter through NAND gates 157, 158, 159 and 160 and resistors R5, R6, R7 and R9. Inverter gates 161, 162, 163, 164, 165, 155, 166 and 156 are employed for isolation and signal phase correction. Switch halves 154a and 154b are ganged together for simultaneous movement to the three phase and single phase positions.

The signals for the buffer-amplifier control are coupled from the three phase-single phase switch and integrated logic circuits back to discrete circuits at the bases of transistors Q7, Q8 and Q9. These transistors can only conduct signals during the time "window" when their base electrodes are not clamped off by the signals represented by wave trains 408, 409 and 410, respectively. When transistors Q7, Q8 and Q9 do conduct, they transfer the "ground" sync signal to the "high" sync signals to transistors Q10, Q11 and Q12, respectively, whose collectors are respectively coupled to leads 170, 171 and 172 which, in turn, are coupled to the C terminals of connectors J1, J2 and J3, which couple the logical control circuitry to the individual static inverters 50a–50c.

The signals employed to clamp the reference flip-flops are picked up from the logical circuitry by resistor R54 and transistors Q22 and Q27.

The timing capacitor disable circuits for the static inverters are comprised of resistors R50, R51, R52 and R53, diode CR12 and transistors Q16 and Q17 for the static inverter coupled to connector J1; resistors R56, R57, R58 and 59, diode CR13, and transistors Q20 and Q21 for the static inverter coupled to connector J2; and resistors R61, R62, R63 and R64, diode CR11 and transistors Q24 and Q25 for the static inverter coupled to connector J3.

An oscillator detector circuit is comprised of resistors R39, R40, R41, R42, R43, R44 and R46, transistors Q13 and Q14, capacitor C4 and diode CR8. As long as master oscillator 108 is running, transistor Q14 remains off. If master oscillator 107 stops operating, transistor Q14 turns on, turning Q15 on which also turns on transistors Q16, Q19, Q20, Q23, Q24 and Q26. This action disables the entire phase locking circuitry and the inverters are enabled to run free on their own circuitry. Thus, the logical control circuit, while being highly reliable for long and constant service, also provides a safety feature for its own possible malfunction wherein the previously disabled local oscillators of each of the static inverters are instantaneously enabled to permit continued operation of the static inverters without any discontinuities. It should further be noted that a malfunction of any of the static inverters will not affect the logical control circuitry 100 or its control over the remaining operative static inverter (or inverters, as the case may be).

Briefly summarizing the operation of the logical control circuitry, d.c. power is supplied from each of the static inverters through their respective terminals A of the connectors J1, J2 and J3. Diodes D1–D3 couple d.c. power to common terminal T and bus 104 which powers the master oscillator. In the example given, the master oscillator operates at a frequency of 4,800 Hz. The integrated circuit regulator 105 is coupled across ground reference bus 131 and the d.c. supply bus 104 to power all of the integrated circuits within dotted rectangle 175 shown in FIG. 4. Dotted rectangle 191 contains the discrete circuit components. The output of oscillator 107 is taken from the common terminal between resistors R24 and R25 and applied to the base of Q5 which functions as a bufferamplifier. The collector of Q5 is coupled through diodes CR1 and CR2 to the base of Q6 and the base of Q1. The collectors of Q6 and Q1 are respectively coupled to the bases of Q3 and Q2. The collector of Q2 is coupled to input 134a of J-K flip flop 134 whose output is employed to drive the ring counter comprised of flip-flops 136–138 as well as providing one input to each of the gates 139–144. Selected outputs of the ring counter are coupled to selected inputs of gates 139–144 in the manner set forth hereinabove. The outputs of gates 139 and 140 are coupled to respective inputs of gates 147. Similarly the outputs of gates 141 and 142 are coupled to the inputs of gates 148 and the outputs of gates 143 and 144 are coupled to the inputs of gates 149. The outputs of gates 147, 148 and 149 generate signals whose waveforms are shown respectively, at 408, 409 and 410 in FIG. 5. The outputs of gates 147-149 are connected to selected inputs of gates 150, 151, 152 and 153. Gates 150–153, together with switch half 154a, from the three phase/single phase switch means 121, shown in FIG. 3. The output of gate 147 is coupled through lead 176 and inverters 164 and 166 to the base of Q7. The outputs of gates 150 and 151 are coupled in common through inverter 155 and lead 177 to the base of Q8. The outputs of gates 152 and 153 are coupled in common to the input of inverter 156 which is coupled to the base of Q9 through lead 178. Transistors Q7 and Q9 can only conduct signals during the time "window" when their bases are not clamped off by the negative going portions of wave trains 408, 409 and 410, respectively. When the wave trains are positive going, transistors Q7–Q9 conduct developing a voltage drop across the collector resistors R31, R33 and R35 causing transistors Q10, Q11 and Q12 to conduct. The collectors of Q10, Q11 and Q12 are respectively coupled to the C terminals of connectors J1, J2 and J3 through leads 170, 171 and 172, respectively. These signals are applied to the respective static inverters to provide three phase operation.

The signals to clamp the reference flip-flops to assure that the flip-flops are in the right state are derived from ring counter 118 and applied through inverters 161 and 162 to the base of Q18 through lead 179. The outputs of gates 157 and 158 are coupled in common to lead 180 which is coupled to the base of Q22. Similarly the outputs of gates 159 and 160 are coupled in common through lead 181 to the base of Q27. The collector-emitter terminals of transistors Q18, Q22 and Q27 are coupled to the terminals D-E respectively, of the connectors J1, J2 and J3. Transistors Q18, Q22 and Q27 are selectively rendered conductive to apply ground potential to the D terminals of the connectors which, in turn, are coupled to the reference input terminals of the static inverter flip-flops. FIG. 3 shows transistors Q18, Q22 and Q27 in block diagram form as the reference flip-flop signal means 122–124, respectively, whose outputs are coupled to the inputs 58a–58c of the flip-flops 53 of each static inverters.

The oscillator detector circuit referred to hereinabove has its transistor Q13 coupled into the collector circuit of amplifier Q5 through diode CR3 and lead 193. The collector of Q13 is coupled to the base of Q14. As long as the master oscillator is running, Q14 is off. If the oscillator stops, Q14 turns on which develops a voltage drop in resistor R44 sufficient to turn on Q15. This causes transistors Q16–Q19, Q20–Q23 and Q24–Q26 to turn on. This action can be seen to develop a short circuit condition across the base-emitter electrodes of Q18, Q22 and Q27 to prevent these transistors from operating, thereby disabling the entire phase locking circuitry. FIG. 3 shows the switches Q18, Q22 and Q27 in block diagram form as 122, 123 and 124, respectively, while the transistor pairs Q16–Q19, Q20–Q23 and Q24–Q26 are shown in block diagram form as the clamping signal reference flip-flop switches 125, 126 and 127, respectively, in FIG. 3. This disabling action permits the local oscillators of each static inverter to be enabled thereby allowing each static inverter to operate without interruption in the case of a malfunction of the master oscillator.

It can therefore be seen from the foregoing description that the present invention provides a novel logical control circuitry for use in combining conventional static inverters and controlling the static inverters to provide three phase output power and alternatively, to provide parallel single phase output power by manipulation of the single phase/three phase control switch. It should further be noted the built-in safety feature permits the operation of static inverters without interruption in the case of any malfunction in the master oscillator circuitry of the logical control means.

Although the present invention has been described in connection with a preferred embodiment, thereof, many variations and modifications will now become apparent to those skilled in the art. It is preferred, therefore, that the present invention be limited not by the specific disclosure herein, but only by the appended claims.

What is claimed is:

1. A logic control circuit for synchronizing a plurality of static inverters each comprising a local oscillator, a local bistable frequency divider coupled to the local oscillator and an output circuit coupled to the frequency divider for producing a regulated a.c. output at a regulated frequency, said logic control circuit comprising:
   a master oscillator;
   multiphase synchronizing means having an input for generating a plurality of phase synchronizing signals at each of its outputs which signals are at equidistant electrical phase intervals, said outputs each being coupled to a respective one of the local bistable frequency dividers of said static inverters for driving the local bistable frequency dividers;
   sensing means coupled to said master oscillator for sensing the operating condition of said master oscillator to generate a disabling signal only when said master oscillator is operating properly, which disabling signal is coupled in common to each of the local oscillators of said static inverters to disable said local oscillators, said disabling signal being terminated upon the malfunctioning of the master oscillator to permit each static inverter to operate under control of its respective local oscillator.

2. The logic control circuit of claim 1 further comprising a reference control means coupled to said multiphase synchronizing means; said reference control means being coupled to the frequency dividers of each static inverter to cause all of said frequency dividers to be driven to the same operating state at the beginning of each cycle of the multiphase outputs.

3. The logic control circuit of claim 1 wherein the local oscillators and the master oscillator are all adapted to operate at the same frequency.

4. The logic control circuit of claim 1 wherein said synchronizing means further comprises:
   a control frequency divider coupled to said master oscillator;
   ring counter means coupled to said control frequency divider;
   logical gating means coupled to said ring counter means for generating said plurality of synchronizing signals.

5. The logic control circuit of claim 4 further comprising single phase/multiphase switch means coupled between said logical gating means and said static inverters for generating multiphase signals when in a multiphase operating mode and for generating signals in time synchronism when in the single phase operating mode to respectively operate the static inverter to provide output power for either multiphase or single phase equipment.

6. The logic control circuit of claim 4 further comprising second logical gating means coupled to said ring counter for generating reference control signals applied to each of the static inverter frequency dividers to control their operating states.

7. The logic control circuit of claim 6 further comprising second switch means coupled between said second logical gating means and said static inverters for providing multiphase reference signals when said second switch means is in the multiphase operating mode and for providing reference signals in phase synchronism when said second switch means is in the single phase operating mode.

8. The logic control circuit of claim 1 wherein said synchronizing means generates three output signals each being 120 degrees out of phase with one another to enable the static inverters coupled thereto to power three phase equipment.

* * * * *